United States Patent [19]
Seeman

[11] 3,922,541
[45] Nov. 25, 1975

[54] METHODS AND APPARATUS FOR STABILIZING THE GAIN OF A RADIATION DETECTOR

[75] Inventor: Bronislav Seeman, Ridgefield, Conn.

[73] Assignee: Schlumberger Technology Corporation, New York, N.Y.

[22] Filed: Dec. 21, 1973

[21] Appl. No.: 427,110

[30] Foreign Application Priority Data
Dec. 21, 1972 France .................. 72.45585

[52] U.S. Cl. .................. 250/256; 250/252; 250/363
[51] Int. Cl. .................. G01v 5/00; G01t 1/20
[58] Field of Search .................. 250/252, 363, 256

[56] References Cited
UNITED STATES PATENTS

| | | | |
|---|---|---|---|
| 2,648,012 | 8/1953 | Scherbatskoy | 250/363 X |
| 3,101,409 | 8/1963 | Fite | 250/363 |
| 3,183,353 | 5/1965 | Baldwin | 250/363 |
| 3,225,195 | 12/1965 | Scherbatskoy | 250/363 |
| 3,428,804 | 2/1969 | Comunnetti | 250/252 |

Primary Examiner—Archie R. Borchelt

[57] ABSTRACT

In accordance with an illustrative embodiment of the present invention, a technique for stabilizing the gain of a radiation detector is described. In this technique, a reference radiation source having a predetermined energy spectrum is located adjacent, or enclosed within, a scintillator of a radiation detector. Those signals produced by the radiation detector which represent energies within an energy range defined by the reference source energy spectrum are selected and used to determine the relationship between the energy spectrum of the reference source and the energy spectrum of the selected detector signals. From this relationship, a reference signal is generated which is used to adjust the radiation detector gain in a non-linear manner to cause the energy spectrum of the selected radiation detector signals to correspond to that of the reference radiation source.

20 Claims, 6 Drawing Figures

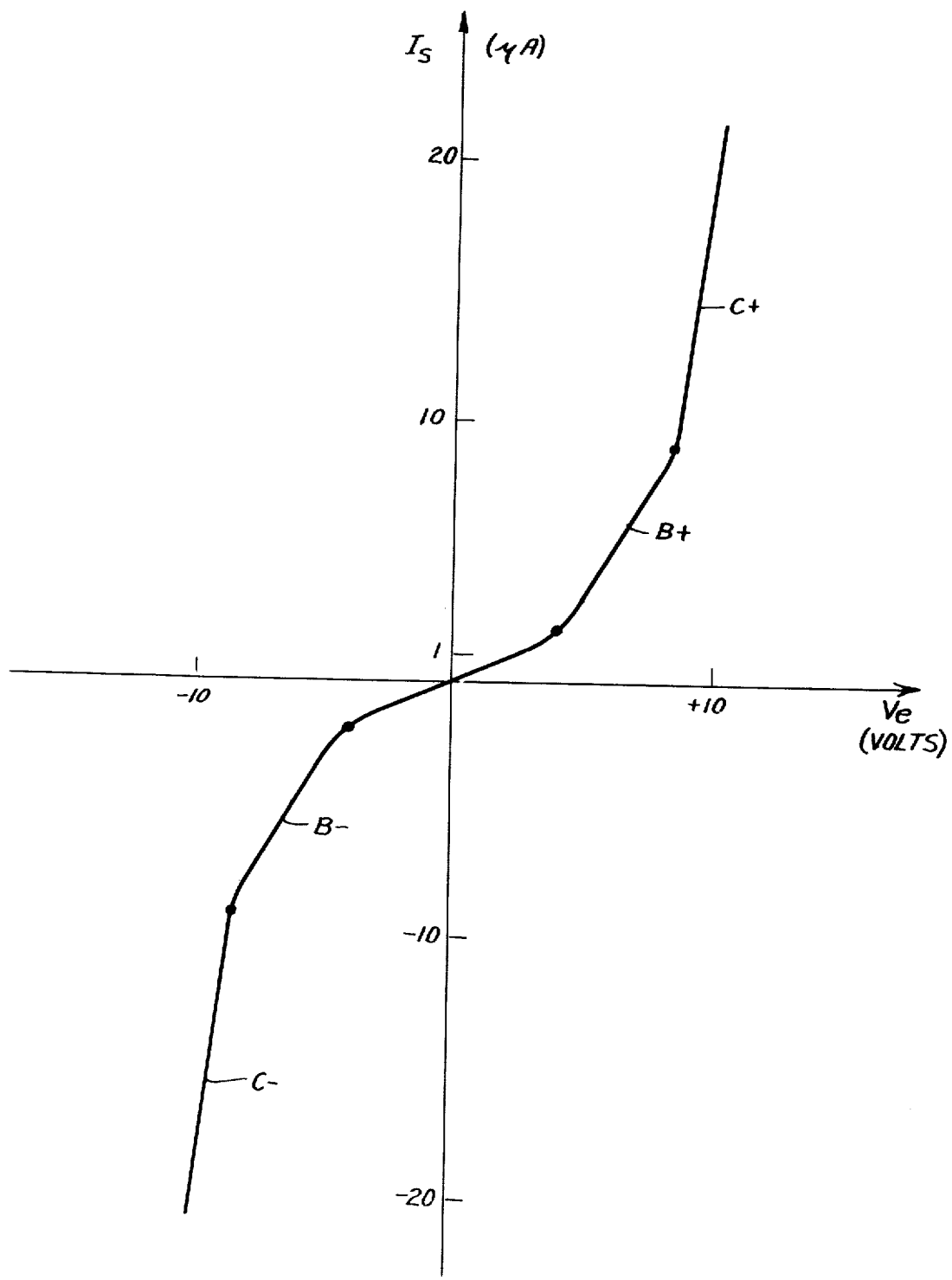

METHODS AND APPARATUS FOR STABILIZING THE GAIN OF A RADIATION DETECTOR

This invention relates to methods and apparatus for stabilizing the gain of radiation detectors and, more particularly, to methods and apparatus for stabilizing the gain of detectors used in spectrometric applications, i.e., which have a response proportional to the received energy, such as scintillation detectors or semiconductor detectors.

The invention is particularly applicable to the stabilization of the gain of photomultipliers used in the tools employed in subsurface prospecting and more particularly to those tools which are responsive to the energy spectrum of gamma-rays which are detected by subsurface tools. One such tool which is dependent on this energy spectrum is the so called gamma-gamma density tool described in U.S. Pat. No. 3,321,625 granted to J. S. Wahl on May 23, 1967 which tool measures formation density.

It is known that density measurements of formations adjacent a borehole are made by means of a tool which comprises a gamma-ray source and a radiation detector, generally a scintillation detector, placed about 40 cm from the source. The gamma-rays emitted by the source lose their energy in the surrounding geological formation primarily from collision with electrons. Some of the gamma-rays reach the detector which thus records a count rate which is an inverse function of the number of electrons per unit volume in the formation. The density of the formation, which is related to the number of electrons, may thus be determined from this count rate.

FIG. 1 shows, for three increasing values $d_1$, $d_2$ and $d_3$ of formation density, the energy spectrum in semilogarithmic coordinates, of the gamma rays reaching the detector. More specifically, the ordinate or vertical axis of FIG. 1 is given as the logarithm of the probability $N(E)$ of detecting a gamma-ray of energy E. The abscisa or horizontal axis is scaled as a linear function of this energy E. This figure shows that above an energy level $E_o$, variations in density will produce linear functions of Log $N(E)$ vs. E but that variations in density will produce deformations in the part of the spectrum located below the energy level $E_o$ (between 180 and 220 keV). The detected gamma rays having an energy higher than $E_o$ maintain, whatever the density, the same spectral distribution and their number is a decreasing exponential function of the density. Accordingly, at the output of the detector account is taken only of pulses having an amplitude higher than a given threshold, hereinafter called the normal count threshold S, which corresponds to detected gamma rays having an energy higher than $E_o$. The recorded count rate thus furnishes the density measurement.

It is immediately apparent that in order for this density measuring technique to provide the best results, the gain of the detection system should be stable, i.e., a gamma ray of a given energy should give rise to a pulse of the same aplitude. Any modification in such gain results in a shift of the spectrum and is equivalent to a shift in the threshold S, thus leading to a modification in the count rate which distorts the density measurement. By way of example, FIG. 2 shows for three increasing values of the gain $G_1$, $G_2$ and $G_3$, the amplitude spectrum of the output pulses of the detector, i.e., the curve giving the probability $N(A)$ of obtaining a pulse of amplitude A, as a function of this amplitude. It is apparent that, if the count threshold S has been defined for a value $G_2$ of the gain, an increase to the value $G_3$ is equivalent to lowering the threshold and consequently leads to the counting of more pulses. Conversely, a decrease in gain to the value $G_1$ is equivalent to raising the threshold and consequently leads to a loss of pulses.

It is known that detection systems and more particularly photomultipliers exhibit significant variations in gain due to the variations in temperature, and in the count rate itself. It is thus important to provide a correction for these gain variations.

One approach to stabilizing the gain of photomultipliers has been to slave their power supply voltage or the gain of the output amplifier to the position of a reference peak produced artificially, outside of the spectrum used for the measurement, by an alpha or gamma radiation source associated with the scintillator as described in a publication entitled "Stabilization of a Gamma Scintillation Spectrometer Against Zero and Gain Drifts" by R. A. Dudley and R. Scarpatelli, *Nuclear Instruments and Methods* (1964), pages 297–313, North-Holland Publishing Co., or by a very stable source of light acting directly on a photomuliplier as shown in U.S. Pat. No. 3,714,441 granted to E. J. Kreda on Jan. 30, 1973. Another stabilization technique is shown in copending application Ser. No. 326,197 by B. Seeman et al filed on Jan. 22, 1973. One way to accomplish such stabilization is to produce a signal which represents the difference between the count rates recorded for two narrow energy windows chosen on the two edges of a reference peak. The gain variations of the photomultiplier, which result in a shift of the peak, and consequently in an imbalance between the two count rates, are thus represented by this signal which then acts on the value of the high voltage applied to the photomultiplier or the gain of its amplifier so as to operate to bring the reference peak to the same energy level.

Up to the present time, the above mentioned correction process has not been altogether satisfactory. If with the above process, one wishes to accurately detect any shift in the reference peak and thus be able to correct it quickly, low statistical noise is necessary in the detection of radiation from the reference source. Until the present invention, this would necessitate the use of a high intensity reference source. However, when using such a high intensity source, the earth formation measurements (in the present example, density measurements) are disturbed by the presence of the Compton background related to this high peak and produced in the detector itself.

If, on the other hand, to prevent the formation measurements from being distorted by the Compton background, use is made of a low intensity source thereby causing significant statistical noise in the detection of radiation from the reference source, the detection of gain variations will be less precise thereby necessitating a slower response in the correction process. Therefore, the amount of time required for the correction process will increase with the degree of shift of the measurement system gain since, with a low intensity reference source, it will take longer to accurately determine not only the degree of shift of the reference peak, but also whether this peak has in fact shifted at all.

In other words, a strong reference source gives insignificant statistical noise in the correction process and thus assures a rapid correction, but distorts the formation measurements; whereas a weak reference source has an insignificant effect on the formation measurements, but gives significant statistical noise in the correction process and, consequently, a slow correction. Because of this, it is necessary with the above correction process to accept a compromise solution using a reference source sufficiently weak to avoid excessive distortion of measurements, but sufficiently strong to avoid excessive slowness in the correction process, mainly in the case of high variations in gain. Such a compromise tends to provide a correction which is not as fast as desired, and a measurement which has a little distortion.

Accordingly, it is an object of the present invention to provide a new and improved gain stabilization technique.

It is another object of the invention to provide such a technique which allows the use of a low-intensity source while maintaining a high speed of response to gain variations.

In accordance with the present invention, methods and apparatus for stabilizing the gaiin of a signal producing radiation detector means having an associated reference radiation source with a predetermined energy spectrum, comprise determining the energy spectrum of those signals produces by said detector means which should, except for gain changes in said detector means, be representative of the predetermined energy spectrum. A reference signal representative of the relationship between the predetermined energy spectrum from the reference radiation source and said determined energy spectrum is produced from this determination. The reference signal is used for applying a non-linear correction to the detector means to maintain a relatively stable gain for it.

To accomplish this, those signals from the detector means which correspond to an energy range defined by the predetermined energy spectrum are selected and used to produce a reference signal representative of the relationship between the reference energy spectrum and that of the selected signals. This reference signal is used to affect the aforementioned non-linear correction to the detector means.

For a better understanding of the present invention, together with other and further objects thereof, reference is had to the following description taken in connection with the accompanying drawings, the scope of the invention being pointed out in the appended claims.

Figure 5:
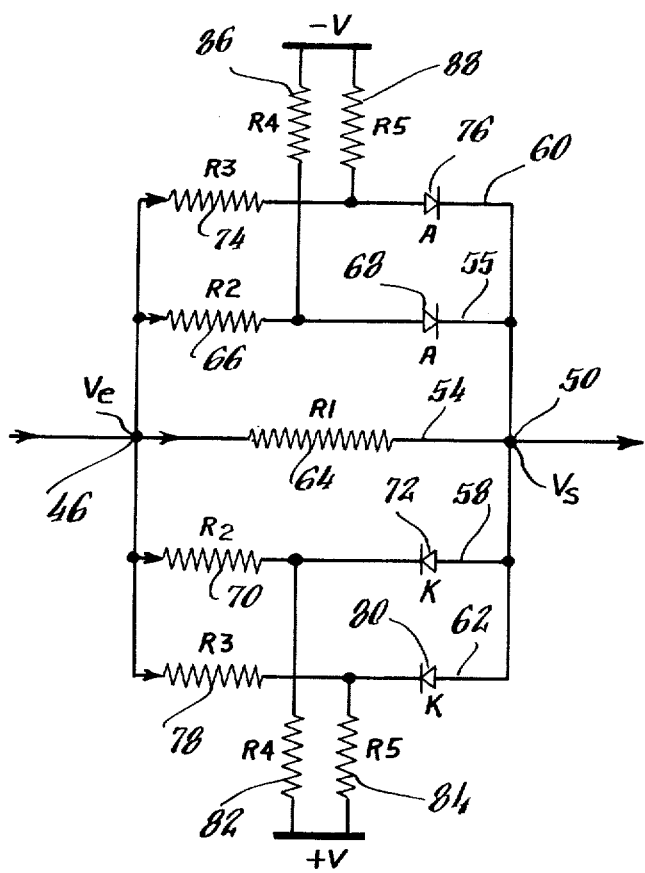
FIG. 5 represents in detail the modulator of the apparatus of FIG. 3.

FIG. 6 gives the response curve of the modulator of FIG. 5.

Figure 1:
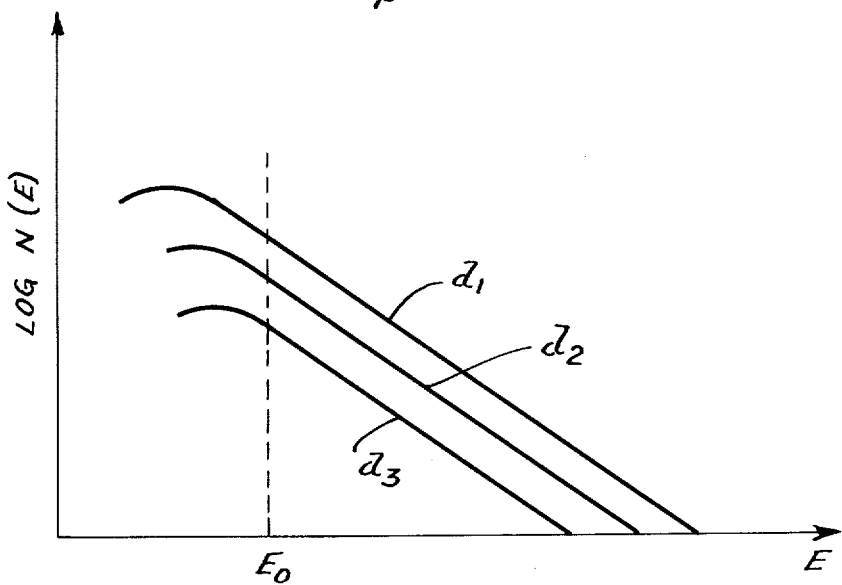
FIG. 1 shows, in the case of a tool used for measuring density in earth formations, the effect of density variations on the energy spectrum of the detected gamma rays.
Figure 2:
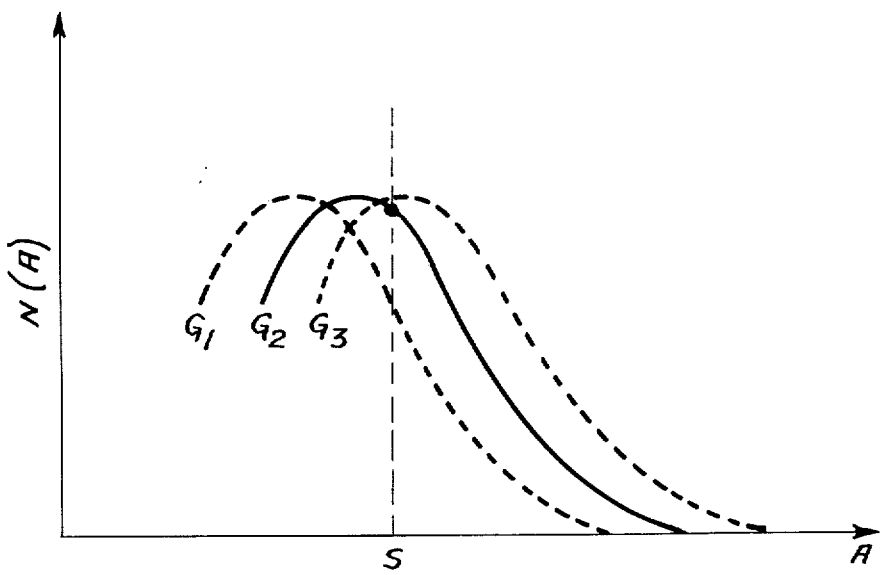
FIG. 2 shows the effect of gain variations in the detector on the amplitude spectrum of the produced pulses.
Figure 3:
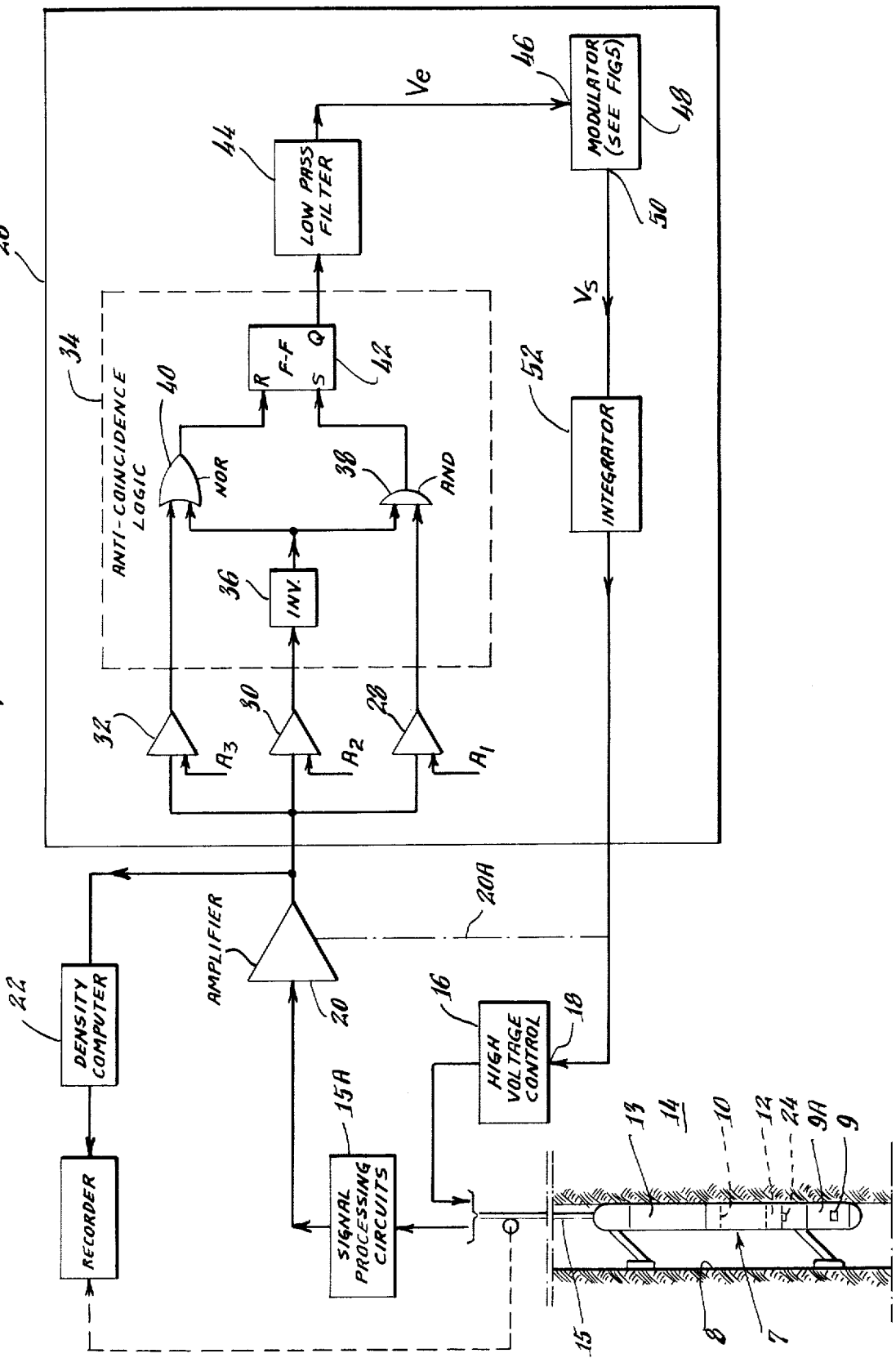
FIG. 3 is a schematic representation of a gain stabilizing apparatus according to the invention.

Referring to FIG. 3, there is shown an earth formation exploring tool 7 in a borehole 8 on the end of a cable 15 for investigating an earth formation 14. The tool 7 includes a gamma-ray source 9 embedded in a gamma-ray absorbing material 9A. The tool also includes radiation detector means which includes a scintillator 12, photomultiplier tube 10 and associated electronics such as a high voltage supply, amplifiers, and the like housed in an electronics section 13 of the tool 7. The downhole electronics in electronics section 13 also includes suitable telemetry circuits for sending and receiving data over conductors in the cable 15 to and from the surface of the earth. Typically, a gamma-gamma density tool has two detectors. In FIG. 3, the second detector is not shown.

At the surface of the earth, the signals from the downhole detectors are applied to the usual signal processing circuits 15A which prepare the signals for application to subsequent signal processing circuits. Considering the case for just one detector means, the output pulses from the circuits 15A are applied to the input of an amplifier 20, whose output is connected to a processing circuit 22. This circuit 22 calculates the density of the formation 14 from the count rate of the received pulses in the usual manner.

As discussed earlier, it is important to stabilize the gain of the detector means. One way of accomplishing this is to control the high voltage supply to the photomultiplier associated with each detector means.

In one example of the present invention, the gain of the photomultiplier 10 is stabilized:

by a gamma-ray source 24 adjacent the scintillator 12 and designed to produce a reference peak (FIG. 4) outside of the spectrum of the pulses delivered by the amplifier 20 (source 24 could be built into the scintillator 12 if desired), and by a device, designated generally by the reference 26, designed to detect the movements of the peak following variations in gain and to correct them by acting on the level of the high-voltage supply of the photomultiplier.

To prevent the disturbance of measurements, the gamma-ray source 24 has a very low activity, a few $\mu$Ci, and is naturally chosen so that the reference peak produced is clearly outside of the diffusion spectrum used for the measurement. By way of example, in a density logging tool in which the spectrum rarely exceeds 450 keV, use is made of a cesium-137 source of 2 $\mu$Ci whose photoelectric peak is at 661 keV.

Figure 4:
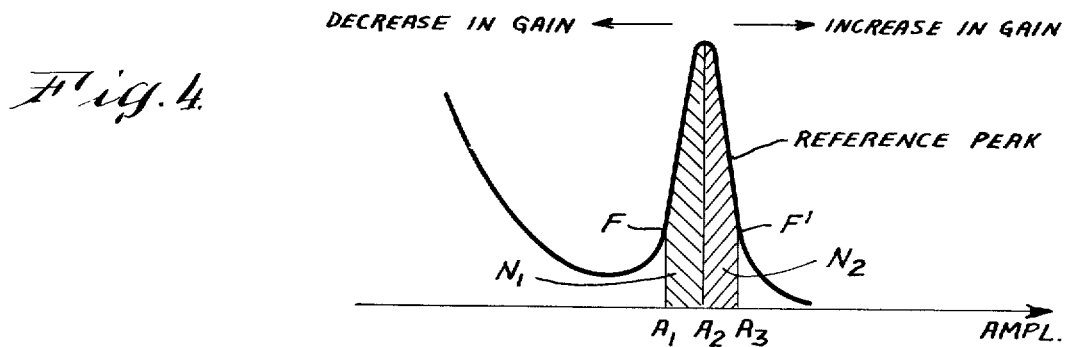
FIG. 4 shows the reference peak produced in the amplitude spectrum of the pulses from the detector of this apparatus.

In the device 26, the pulses collected at the output of the amplifier are applied in parallel to three voltage comparators 28, 30 and 32 whose respective references are the amplitudes $A_1$, $A_2$ and $A_3$. FIG. 4 shows how these three values are chosen. The amplitude $A_2$ corresponds to the summit S of the reference peak for a given gain to be kept constant, whereas the amplitudes $A_1$ and $A_3$ correspond to two corresponding points F and F' at the base of its edges. The vertical lines of these two points delimit, with the vertical line of S, two zones of equal area so that the count rate $N_1$ of the pulses having an amplitude between $A_1$ and $A_2$ is equal to the count rate $N_2$ of the pulses having an amplitude between $A_2$ and $A_3$. As an example, with a cesium-137 source having an activity of 2 $\mu$Ci the count rate of the pulses having an amplitude between $A_1$ and $A_3$ is 200 pulses/second.

The outputs from the three comparators are applied to an anticoincidence logic 34 comprising an inverter circuit 36, an AND gate 38, a NOR circuit 40 and a flip-flop 42. The output of the comparator 30 is connected, through the inverter circuit 36, to an input of the AND gate 38 and to an input of the NOR circuit 40. The output of the comparator 28 is connected to the other input of the AND gate 38 and that of the comparator 32 to the other input of the NOR circuit 40. Finally, the input R of the flip-flop 42 is connected to the output of the NOR circuit and its input S to the output of the AND gate. The output Q of this flip-flop is connected to the input of a low-pass filter 44. The latter is a RC filter whose cutoff frequency is 2 Hz for a source delivering, between $A_1$ and $A_3$, a count rate of 200 counts/second. The output of this filter is connected to the input 46 of a nonlinear modulator circuit 48 furnishing, at its output 50, a voltage $V_s$ which in this example, is approximately proportional to the hyperbolic sine of the voltage $V_e$ applied to its input 46. Finally, this modulator is followed by an integrating stage 52 whose output is connected to a high-voltage power supply control unit 16 which sends a signal to the high voltage power supply in the tool 7 to appropriately adjust this high voltage and thus the gain of the detector means.

FIG. 5 represents schematically an advantageous embodiment of the modulator 48. The latter consists of five branches 54, 56, 58, 60 and 62 connected in parallel between its input 46 and its output 50, and comprising respectively:

a resistor 64 with a value $R_1$,
a resistor 66 with a value $R_2$ and a diode 68, in series,
a resistor 70 with a value $R_2$ and a diode 72, in series,
a resistor 74 with a value $R_3$ and a diode 76, in series,
a resistor 78 with a value $R_3$ and a diode 80, in sries.

These four diodes are identical. The only difference between the branches 56 and 58 is that the diode 68 of the branch 56 is connected to the output 50 through its cathode, whereas the diode 72 of the branch 58 is connected through its anode. Likewise, the difference between the branches 60 and 62 is that the diode 76 of the branch 60 is connected to the output 50 through its cathode whereas the diode 80 of the branch 62 is connected through its anode. Finally, the diodes 72 and 80 have their cathode connected to a voltage source +V, respectively through a resistor 82 having a value $R_4$ and a resistor 84 having a value $R_5$, whereas the diodes 68 and 76 have their cathode connected to a voltage source −V, respectively through a resistor 86 having a value $R_4$ and a resistor 88 having a value $R_5$.

It is easy to establish that the potentials $v_{A68}$, $v_{A76}$, $v_{K72}$ and $v_{K80}$ respectively on the anode of the diode 68, the anode of the diode 76, the cathode of the diode 72 and the cathode of the diode 80 are expressed, according to the voltage $V_e$ at the input 46, by the following relationships;

$$v_{A68} = \frac{V_e R_4 - V R_2}{R_2 + R_4}$$

$$v_{A76} = \frac{V_e R_5 - V R_3}{R_3 + R_5}$$

$$v_{K72} = \frac{V_e R_4 + V R_2}{R_2 + R_4}$$

$$v_{K80} = \frac{V_e R_5 + V R_3}{R_3 + R_5}$$

Under these conditions, and moreover assuming that the ratio $R_2/R_4$ is chosen lower than the ratio $R_3/R_5$, we see that:

as the input voltage $V_e$ increases from zero, the four diodes are first reverse - biased, and then the diodes 68 and 76 are forward-biased one after the other starting at $V_e = V R_2/R_4$ and $V_e = V R_3/R_5$ respectively;

as the input voltage $V_e$ decreases from zero, the four diodes are first reverse-biased, and then the diodes 72 and 80 are forward-biased one after the other, beginning at $V_e = -V R_2/R_4$ and $V_e = -V R_3/R_5$.

Therefore, through a suitable selection of the values $R_1$, $R_2$, $R_3$, $R_4$ and $R_5$, the circuit 48 can be given the response curve $i_s = f(V_e)$ shown in FIG. 6, where $i_s$ is the current applied to the input of the integrator. This curve represents approximately the function $i_s = k.\sinh V_e$ formed by five straight-line portions A, B+, C+, B− and C−:

The portion A corresponds to the range for which the four diodes are reverse-biased; the branches 56, 58, 60 and 62 containing these diodes thus have a very high resistance, so that the equivalent resistance of the circuit is substantially equal to $R_1$.

The portion B+ corresponds to the range for which the diode 68, then forward-biased, associates the resistor 66 with the resistor 64, so that the equivalent resistance of the circuit is substantially equal to $R_1R_2/(R_1 + R_2)$, and thus lower than $R_1$.

The portion C+ corresponds to the range for which the diodes 68 and 76, both forward-biased, associate the resistors 66 and 74 with the resistor 64, so that the equivalent resistance of the circuit is substantially equal to $R_1R_2R_3/(R_1R_2 + R_1R_3 + R_2R_3)$, and thus lower than $R_2$.

The portion B−, the negative counterpart of B+, corresponds to the range for which the diode 72, then forward-biased, associates the resistor 70 with the resistor 64, so that the equivalent resistance of the circuit is substantially equal to $R_1R_2/(R_1 + R_2)$.

The portion C−, the negative counterpart of C+, corresponds to the range for which the diodes 72 and 80, both forward-biased, associate the resistors 70 and 78 with the resistor 64, so that the equivalent resistance of the circuit is substantially equal to $R_1R_2R_3/(R_1R_2 + R_1R_3 + R_2R_3)$.

Summarizing, therefore, as the input voltage $V_e$ increases, resistors of suitably chosen values are associated in parallel with the basic resistor 64 and, lowering thereby the equivalent resistance of the circuit, produce an increase in the coefficient of proportionality between the input and output signals, allowing the curve $i_s = f(V_e)$ to be assimilated with the curve $i_s = k.\sinh V_e$.

As an example and approximately:

The portion A extends from $V_e = -4v$ to $V_e = +4v$, with a slope of 0.4 μA/v;

The portion B+ extends from $V_e = +4v$ to $V_e = +8v$, with a slope of 1.5 μA/v;

The portion C+ extends beyond $V_e = +8v$, with a slope of 7 μA/v;

The portion B− extends from $V_e = -4v$ to $V_e = -8v$, with a slope of 1.5μA/v;

The portion C− extends beyond $V_e = -8v$, with a slope of 7μA/v.

This is obtained with $R_1 = 1$ MΩ, $R_2 = 380$ KΩ, $R_3 = 70$ KΩ, $R_4 = 540$ kΩ, and $R_5 = 45$ kΩ.

The operation of the apparatus of FIG. 3 can now be described. It should first be stated that the output pulses from the amplifier 20, having an amplitude lower than $A_1$ have no effect on the comparators 28, 30 and 32;

an amplitude higher than $A_1$, but lower than $A_2$, trigger the comparator 28 but have no effect on the other two;

an amplitude higher than $A_2$, but lower than $A_3$, trigger the comparators 28 and 30 but have no effect on the comparator 32;

an amplitude higher than $A_3$ trigger the three comparators.

Consequently, the appearance at the output of the amplifier 20 of a pulse having an amplitude lower than $A_1$ is not felt by the logic 34. On the other hand, when a pulse having an amplitude between $A_1$ and $A_2$ appears, the two inputs of the AND gate 38 are at 1 whereas the inputs of the NOR circuit 40 are respectively at 1 and 0, the output of the AND gate is thus at 1 but that of the NOR circuit is at 0, so that the flip-flop 42 receives at its input R a pulse which resets it. In the case of a pulse having an amplitude between $A_2$ and $A_3$, it is, on the contrary, the inputs of the ANd gate which are rspectively at 1 and 0 whereas the two inputs of the NOR circuit are at 0; the output of the AND gate is thus at 0, but that of the NOR circuit is at 1, so that the flip-flop 42 receives at its input S a pulse which sets it. Thus, flip-flop 42 is triggered on "0" level signals.

With the output Q of the flip-flop 42 thus being reset by a pulse having an amplitude between $A_1$ and $A_2$, and set for a pulse having an amplitude between $A_2$ and $A_3$, the output level of the low-pass filter 44 is representative of the deviation between the count rates $N_1$ and $N_2$ of the pulses having an amplitude between $A_1$ and $A_2$ and between $A_2$ and $A_3$ respectively. More precisely:

if the gain keeps its reference value, for which the two count rates are equal, the mean output voltage of the filter is zero;

if the gain increases and thereby produces a shift (toward the right) of the reference peak, corresponding to a decrease in $N_1$ and an increase in $N_2$, the mean output voltage of the filter has a positive value proportional to the imbalance between the two count rates;

if the gain decreases and thus produces a shift (toward the left) of the reference peak, corresponding to a decrease in $N_2$ and to an increase in $N_1$, the mean output voltage of the filter has a negative value proportional to the unbalance between the two count rates.

It is this voltage which constitutes the voltage $V_e$ applied to the input 46 of the modulator 48. The latter, operating as described hereinabove, thus provides at its output 50 a voltage $V_s$ approximately proportional to the hyperbolic sine of $V_e$. The integrator 52, receiving this voltage, will thus apply to the control input 18 of the power supply 16 of the photo-multiplier a continuous voltage to stabilize the gain at its reference value. More precisely:

if no gain variation is detected, the mean voltage delivered to the integrator is zero and the high voltage applied to the photo-multiplier remains unchanged;

if a gain increase is detected, the mean voltage delivered to the integrator has a negative value proportional to the hyperbolic sine of the deviation between the two count rates; this voltage then makes the voltage applied to the photo-multiplier decrease until this deviation is cancelled;

if a gain decrease is detected, the mean voltage delivered to the integrator has a positive value proportional to the hyperbolic sine of the deviation between the two count rates; this voltage then makes the voltage applied to the photo-multiplier decrease until this deviation is cancelled.

Thus, a variation in the gain of the detection system is corrected by means of an error signal approximately proportional to the hyperbolic sine of the variation, i.e. (with the hyperbolic sine function having a derivative whose absolute value increases constantly from the origin) by means of an error signal proportional to the variation, the coefficient of proportionality itself being an increasing function of the variation. In other words, when a variation in gain is detected, the speed at which it tends to be corrected is proportional to the deviation. In prior art apparatus, it is known that, owing to the use of a reference source with a very low activity, the statistical error on the detection of gain variations has the effect of increasing the time necessary for their correction, this effect being proportional to the variations to be corrected. The apparatus according to the invention makes it possible to compensate for this phenomenon because, on the contrary, the rate at which it tends to correct the variations in gain is proportional to the extent of the variations. Thus, in spite of the use of a low-activity source, the rate of response to large variations in gain is considerably increased. At the same time, detected low variations in gain which may be caused by statistical errors, are compensated for at a much lower response rate to thereby give the system time to confirm that such detected changes in gain are not due to statistical errors.

In other words, the system functions in a small-slope zone of the response curve of the modulator (Portion A of FIG. 6) so that the input of the integrator 52 is thus at a level near zero, which naturally confers upon the correction system at equilibrium a low sensitivity to noise. However, when large variations are detected, the system sensitivity greatly increases to more rapidly correct for such gain changes.

By way of example, the methods and apparatus of the present invention reduces a distrubance of 100% to a value of 1% 6 times faster than an apparatus of the same type not performing a modulation of the error signal.

Of course, the correction of gain variations could be achieved by acting on the very gain of the output amplifier of the detector instead of on the high-voltage power supply. In this case, the output of the integrator 52 is connected to the amplifier 20 gain control input as represented by the dash-dot line 20A.

While the circuits 16, 20 and 26 of FIG. 3 have been shown at the surface of the earth, these circuits could all be located in the tool 7 to eliminate the surface to tool telemetry. The techniques of the present invention could be utilized with the barite correction techniques shown in copending application Ser. No. 326,379 filed by B. Seeman on Jan. 24, 1973.

While there have been what are at present considered to be preferred embodiments of this invention, it will be obvious to those skilled in the art that various changes and modifications may be made therein without departing from the invention, and it is, therefore, intended to fall within the true spirit and scope of the invention.

What I claim is:

1. Earth formation exploring apparatus for stabilizing the gain of a radiation detector, comprising:
   a. an earth formation exploring means for carrying radiation source means for irradiating an earth formation with radiation, a nearby detector means for detecting radiation and producing signals representative thereof, and reference radiation source means for emitting radiation having a predetermined energy spectrum;
   b. means responsive to said signals for selecting only those of said produced signals which represent energies within a range representative of the range of said predetermined energy spectrum to produce a reference signal representative of the relationship between said predetermined energy spectrum from the reference radiation source and the energy spectrum of said selected signals; and
   c. means responsive to said reference signal for applying a non-linear correction to said detector means to maintain a relatively stable gain for said detector means.

2. Apparatus for stabilizing the gain of a signal producing radiation detector having an associated reference radiation source with a predetermined energy spectrum, comprising:
   a. means responsive to signals derived from said radiation detector for selecting only those of said signals which represent energies within a range representative of the range of said predetermined energy spectrum to produce a reference signal representative of the relationship between said predetermined energy spectrum from the reference radiation source and the energy spectrum of said selected signals; and
   b. means reponsive to said reference signal for applying a non-linear correction to said detector means to maintain a relatively stable gain for said detector means.

3. Earth formation exploring apparatus for stabilizing the gain of a radiation detector means, comprising:
   a. an earth formation exploring means for carrying radiation source means for irradiating an earth formation with radiation, a nearby detector means for detecting radiation and producing signals representative thereof, and reference radiation source means for emitting radiation having a predetermined energy spectrum;
   b. means responsive to said signals for detemining the energy spectrum of those signals produced by said detector means which should, except for gain changes in said detector means, be representative of said predetermined energy spectrum and producing a reference signal representative of the relationship between said predetermined energy spectrum from the reference radiation source and said determined energy spectrum; and
   c. means responsive to said reference signal for applying a non-linear correction to said detector means to maintain a relatively stable gain for said detector means.

4. Apparatus for stabilizing the gain of a signal producing radiation detector means, having an associated reference radiation source with a predetermined energy spectrum, comprising;
   a. means responsive to said signals derived from said detector means for determining the energy spectrum of those signals produced by said detector means which should, except for gain changes in said detector means, be representative of said predetermined energy spectrum and producing a reference signal representative of the relationship between said predetermined energy spectrum from the reference radiation source and said determined energy spectrum; and
   b. means responsive to said reference signal for applying a non-linear correction to said detector means to maintain a relatively stable gain for said detector means.

5. A method of stabilizing the gain of a signal producing radiation detector having an associated reference radiation source with a predetermined energy spectrum, comprising:
   a. determining the energy spectrum of those signals produced by said detector means which should, except for gain changes in said detector means, be representative of said predetermined energy spectrum and producing a reference signal representative of the relationship between said predetermined energy spectrum from the reference radiation source and said determined energy spectrum; and
   b. applying a non-linear correction to said detector means in response to said reference signal to maintain a relatively stable gain for said detector means.

6. An earth formation exploring method for stabilizing the gain of a radiation detector, comprising:
   a. moving through a borehole an earth formation exploring means which carries radiation source means for irradiating an earth formation with radiation, a nearby detector means for detecting radiation and producing signals representative thereof, and reference radiation source means for emitting radiation having a predetermined energy spectrum;
   b. determining the energy spectrum of those signals produced by said detector means which should, except for gain changes in said detector means, be representative of said predetermined energy spectrum and producing a reference signal representative of the relationship between said predetermined energy spectrum from the reference radiation source and said determined energy spectrum; and
   c. applying a non-linear correction to said detector means in response to said reference signal to maintain a relatively stable gain for said detector means.

7. Apparatus according to claim 1 wherein said correction non-linearity as a function of said reference signal.

8. Apparatus according to claim 1 wherein a selected change in said reference signal is a function of the magnitude of detector gain instability and said correction non-linearity is a function of said reference signal selected change.

9. Apparatus according to claim 1 wherein said correction non-linearity is proportional to said reference signal with a coefficient of proportionality that is an increasing function of detector gain variation.

10. Apparatus according to claim 1 wherein said predetermined energy spectrum includes a reference peak that is divided about its maximum amplitude into two zones having substantially equal count rates; said produced signals are similarly selected; said reference signal is representative of a gain instability induced, non-equal count rate between the two zones for the selected signals and is approximately proportional to the magnitude of said count rate non-equality; and said non-linear correction is approximately proportional to the hyperbolic sine of the reference signal.

11. Apparatus according to claim 2 wherein said correction non-linearity is a function of said reference signal.

12. Apparatus according to claim 2 wherein a selected change in said reference signal is a function of the magnitude of detector gain instability and said correction non-linearity is a function of said reference signal selected change.

13. Apparatus according to claim 2 whherein said correction non-linearity is proportional to said reference signal with a coefficient of proportionality that is an increasing function of detector gain variation.

14. Apparatus according to claim 2 wherein said predetermined energy spectrum includes a reference peak that is divided about its maximum amplitude into two zones having substantially equal count rates; said produced signals are similarly selected; said reference signal is representative of a gain instability induced, non-equal count rate between the two zones for the selected signals and is approximately proportional to the magnitude of said count rate non-equality; and said non-linear correction is approximately proportional to the hyperbolic sine of the reference signal.

15. A method according to claim 5 wherein said applied correction non-linearity is a function of said reference signal.

16. A method according to claim 5 wherein a selected change in said reference signal is a function of the magnitude of detector gain instability and said applied correction non-linearity is a function of said reference signal selected change.

17. A method according to claim 5 wherein said applied correction non-linearity is proportional to said reference signal with a coefficient of proportionality that is an increasing function of detector gain variation.

18. a method according to claim 6 wherein said applied correction non-linearity is a function of said reference signal.

19. A method according to claim 6 wherein a selected change in said reference signal is a function of the magnitude of detector gain instability and said applied correction non-linearity is a function of said reference signal selected change.

20. A method according to claim 6 wherein said applied correction non-linearity is proportional to said reference signal with a coefficient of proportionality that is an increasing function of detector gain variation.

* * * * *